UNITED STATES PATENT OFFICE.

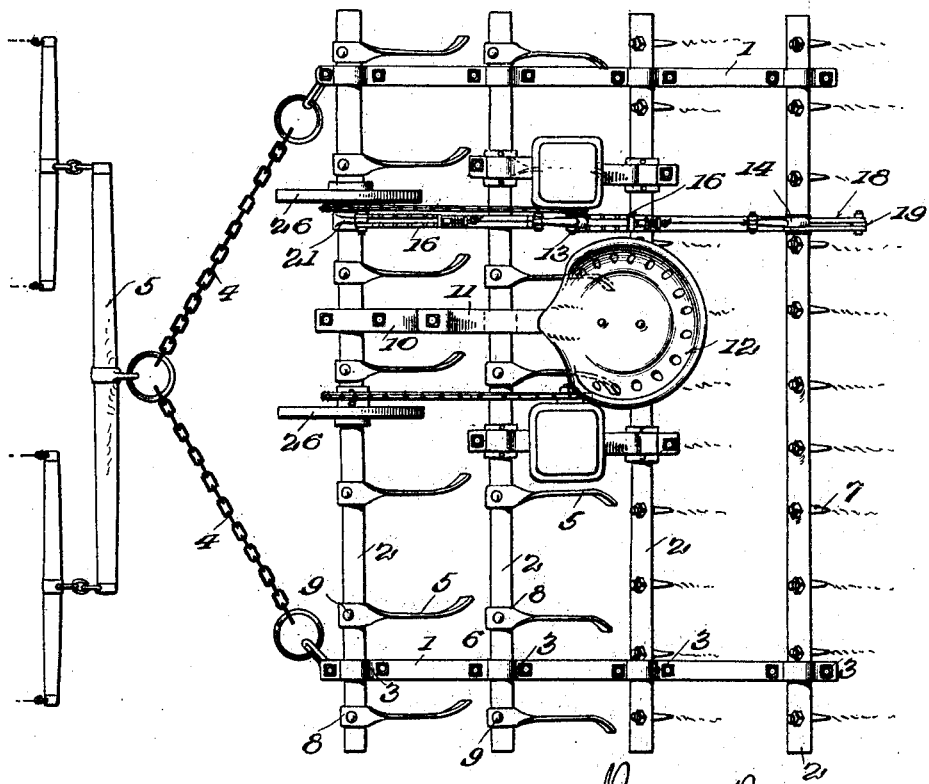

WILLIAM E. ATON AND WILLIE J. ATON, OF MILBURN, KENTUCKY, ASSIGNORS OF ONE-THIRD TO L. J. BRYANT, OF MILBURN, KENTUCKY.

AGRICULTURAL IMPLEMENT.

1,395,329.      Specification of Letters Patent.      Patented Nov. 1, 1921.

Application filed October 28, 1919. Serial No. 334,050.

*To all whom it may concern:*

Be it known that we, WILLIAM E. ATON and WILLIE J. ATON, citizens of the United States, residing at Milburn, in the county of Carlisle and State of Kentucky, have invented certain new and useful Improvements in Agricultural Implements, of which the following is a specification.

Our invention relates to agricultural implements and has for its object the provision of a simple and inexpensive implement by the use of which the surface of the ground will be thoroughly pulverized and a proper seed bed formed. The invention also has for its object to provide means whereby the ground-engaging members may be set at any desired angle and held in the set position.

The invention is illustrated in the accompanying drawings, in which—

Figure 1 is a plan view of an agricultural implement embodying our improvements;

Fig. 2 is a side view of the same.

In carrying out our invention, we employ a frame consisting of longitudinally disposed side or frame bars 1 on which transverse tooth bars 2 are mounted for rocking movement. The tranverse bars 2 may conveniently be tubes and are fitted in seats or bearings 3 formed in the frame bars 1 whereby the latter will support the tooth bars and permit rotation of the same. Draft chains 4 are secured to the front ends of the frame bars 1 and a whiffletree 5 is connected with the front ends of said chains whereby draft animals may be connected with the implement to draw the same over a field. It is to be understood, however, that the machine may be coupled to a tractor and the larger sizes will be equipped with a coupling especially designed to connect with a tractor.

In the arrangement shown in the accompanying drawings, four transverse tubular bars 2 are employed, the two forward bars having secured thereto scraper blades 5 having their ends 6 deflected laterally so that they will cut into the surface soil and turn the same to one side and the rear two bars are equipped with straight harrow teeth 7, as shown. The teeth 7 may have their shanks inserted through the tubes 2 and clamped therein by suitable securing nuts while the blades 5 have their front ends coiled or wrapped around the tubes, as shown at 8, and secured by bolts 9 inserted through the tubes and the said coiled ends and equipped with suitable retaining nuts. The blades 5 are somewhat resilient so that they will yield slightly to the draft of the implement but will cut into and slightly turn the soil and the blades on the first tooth bar have their ends turned in one direction while the ends of the blades on the second tooth bar extend in the opposite direction whereby the entire surface of the field will be treated. The blades 5 at their points of attachment to the transverse bars 2, are preferably given a quarter turn or twist so as to cause the longitudinal edges of said blades to be presented to the ground and thus facilitate cutting the soil. The straight teeth 7 will, of course, merely pulverize the soil and leave the surface in a level condition so that a good seed bed will be prepared. The longitudinally disposed seat-supporting bar 10 is fitted upon the two forward transverse bars and the seat standard 11 is secured to and rises from the said bar 10, a seat 12 being secured upon the upper end of the standard. Operating levers 13 and 14 are provided within convenient reach of the driver upon the seat 12 and the lever 13 is secured rigidly to the second transverse tubular rocking bar while the lever 14 is secured to the third transverse tubular rocking bar. The levers are disposed on radii of the respective tubular bars and are pivoted to short bars 15 forming the bottom of quadrants 16 which may be engaged by latches 17 upon the respective levers in the usual manner. The rear quadrant has its rear end extended into a link 18 which is pivoted at its rear end to a crank arm 19 rising from the rearmost tubular bar 2, while the forward quardrant 16 has its front end similarly extended to form a link 20 which is pivoted to a crank arm 21 secured to and rising from the foremost tubular bar. It will be understood that the crank arms 19 and 21 are arranged parallel to the levers 14 and 13, respectively, and the pivotal connection of the levers to the base bars of the quadrants completes an extensible or foldable frame which acts to set the harrow teeth and the blades 5 at any desired angle and to hold them at that angle. The ends of the short bars 15 of the quadrants are preferably bent or folded over the upper longitudinal edges of the links 18 and 20, as shown.

If desired, rollers 26 may be mounted on the front transverse bar 2 for supporting the free end of the harrow.

If the lever 14, for instance, be swung forwardly the tubular bar 2 to which the said lever is secured will be rotated about its own longitudinal axis and the teeth 7 thereby set at a greater or less angle to the ground. The pivotal connection of the lever to the bar 15 will cause the said bar to also move forwardly and this movement will be, of course, transmitted directly to the quadrant 16 and the link 18 so that the crank arm 19 will also be swung forwardly and the rearmost tubular bar 2 rocked or rotated so that the harrow teeth thereon will be given the same inclination as that given the teeth on the preceding tubular bar. The bars carrying the blades 5 may be likewise adjusted by manipulation of the lever 13 and it will be understood that the blades 5 and the teeth 7 may be used together or separately as the nature of the soil may demand. The bar 10 upon which the seat-carrying standard is secured is fitted to the tubular transverse bars in the same manner that the longitudinal end bars 1 are fitted thereto so that there will be no interference with the rocking adjustment of the ground-engaging members. The device is not complicated and has been found highly efficient in use while it can be manufactured at a low cost.

Having thus described the invention, what is claimed as new is:

1. An agricultural implement including spaced side bars, a plurality of transverse bars journaled for rocking movement in the side bars, blades secured to and extending rearwardly from certain of the bars, harrow teeth carried by other of said bars, crank arms projecting upwardly from the outer transverse bars, quadrants each having one end thereof extended to form a link pivotally connected with the adjacent crank arm and with its base portion secured to the adjacent link, and operating levers rigidly secured to the inner transverse bars and pivotally connected to the base members of the quadrants for rocking the transverse bars and changing the angle of the blades and harrow teeth with respect to the ground.

2. An agricultural implement comprising spaced side bars, outer and intermediate transverse bars journaled for rocking movement in the side bars, the outer transverse bars being provided with upstanding crank arms, blades depending from certain of said transverse bars, harrow teeth depending from others of the transverse bars, operating levers rigidly secured to the intermediate bars, quadrants each including a base member pivotally connected to the adjacent lever and having one end thereof extended to form a link for engagement with the adjacent crank arm, said quadrants being provided with teeth, and latch members carried by the levers and engaging the teeth of the quadrants.

3. An agricultural implement comprising spaced longitudinal side bars, a plurality of transverse tubular bars journaled for rocking movement in the side bars and arranged in pairs, blades mounted on the forward pair of transverse bars and having their free ends extended rearwardly and deflected laterally, the ends of the blades on one of the forward bars being bent in a direction opposite to the ends of the blades on the other forward bar, harrow teeth rigidly secured to the rear pair of transverse bars and disposed in staggered relation to the blades, and levers operatively connected with the forward and rear pairs of bars for rocking said pairs of bars independently of each other thereby to vary the angle of the blades and harrow teeth with respect to the ground.

4. An agricultural implement comprising spaced longitudinal side bars, a plurality of transverse bars journaled for rocking movement in the side bars, the outer bars being provided with upstanding crank arms, levers rigidly secured to the inner transverse bars, a rear quadrant having one end thereof extended rearwardly to form a link for pivotal connection with the crank arm of the rear outer transverse bar and provided with a base portion pivotally connected with one of the levers and having a portion thereof bent over the upper longitudinal edge of the link, a forward quadrant having a portion thereof extended forwardly to form a link pivotally connected with the crank arm of the forward outer transverse bar and provided with a base portion pivotally connected to the other lever and extended over the upper edge of the last-mentioned link, blades depending from certain of the transverse bars, harrow teeth depending from other of the bars and disposed in staggered relation to the blades, and latch members carried by the levers and engaging the quadrants for holding the transverse bars in a set position.

5. An agricultural implement including spaced side bars having seats formed therein, a plurality of tubular transverse bars mounted for rocking movement in said seats, said transverse bars being arranged in pairs, a plurality of blades rigidly secured to the forward pair of transverse bars and each having its intermediate portion provided with a quarter twist to present the longitudinal edges of the blades to the ground and its free end deflected laterally, the deflected ends of the blades on one transverse bar of said pair being bent in a direction opposite the deflected ends of the blades on the other bar of said pair, harrow teeth depending from the rear pair of transverse bars, means operatively connected with the rear pair of transverse bars for rocking the same and holding the bars in a set position, and means independent of the first-mentioned means operatively connected with the forward pair of bars for rocking said forward transverse bars.

In testimony whereof we affix our signatures.

WILLIAM E. ATON. [L. S.]
WILLIE J. ATON. [L. S.]